United States Patent
Tan et al.

(10) Patent No.: US 7,098,443 B2
(45) Date of Patent: Aug. 29, 2006

(54) TEMPERATURE COMPENSATION METHOD AND APPARATUS FOR COLOR SENSORS

(75) Inventors: Boon Keat Tan, Penang (MY); Yoke Peng Boay, Penang (MY); Len Li Kevin Lim, Perak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 215 days.

(21) Appl. No.: 10/903,112

(22) Filed: Jul. 30, 2004

(65) Prior Publication Data
US 2006/0022122 A1 Feb. 2, 2006

(51) Int. Cl.
*G01J 3/50* (2006.01)

(52) U.S. Cl. ............................ 250/226; 250/238

(58) Field of Classification Search ........... 250/226, 250/238, 208.1
See application file for complete search history.

(56) References Cited

U.S. PATENT DOCUMENTS 5,264,921 A * 11/1993 Jinnai ..................... 348/655

* cited by examiner

*Primary Examiner*—Que T. Le

(57) ABSTRACT

Method and apparatus for compensating for variations in the output signal of a color sensor due to varying temperature of the color sensor. The color sensor receives light and generates an output signal that is based on the received light. The temperature compensation mechanism measures the temperature of the color sensor and uses the measured temperature to selectively adjust the output signal of the color sensor to generate a compensated output signal that is not dependent on temperature of the color sensor.

18 Claims, 6 Drawing Sheets

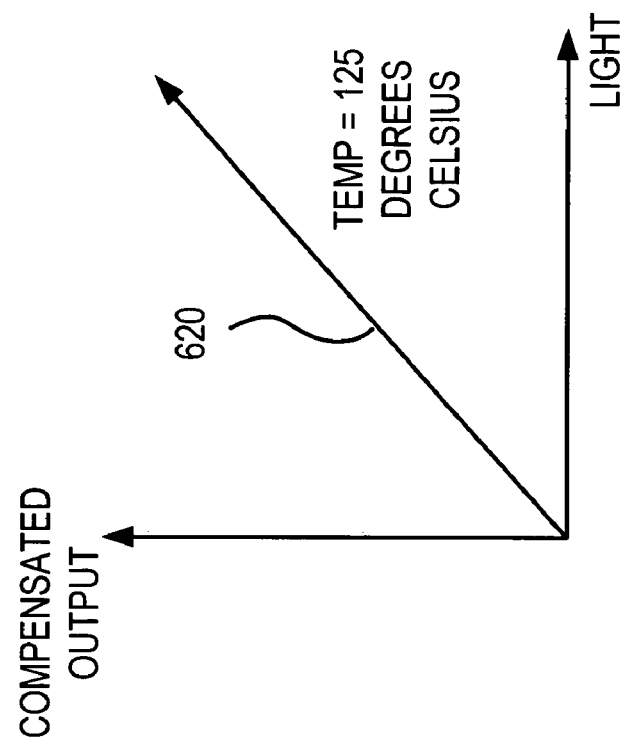
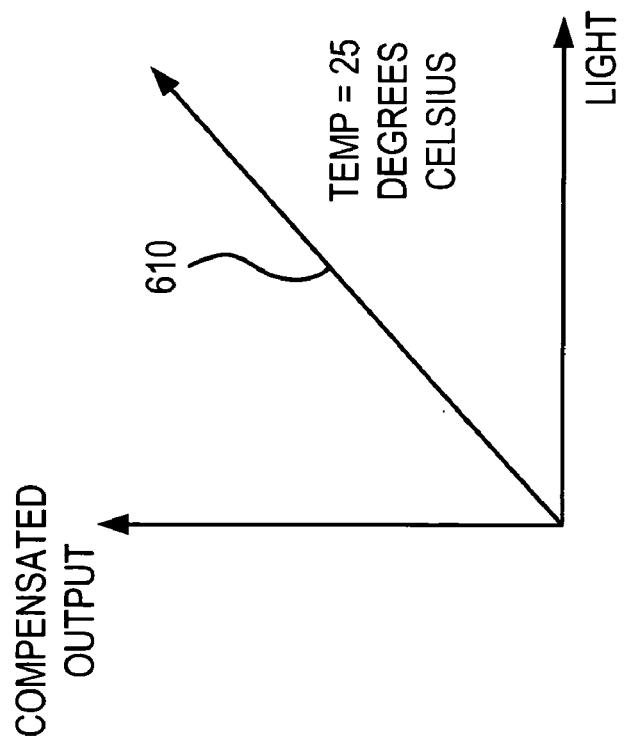
FIG. 6

TEMPERATURE COMPENSATION METHOD AND APPARATUS FOR COLOR SENSORS

BACKGROUND OF THE INVENTION

Color sensors are widely used to detect color for various systems. A color sensor generates a voltage output that represents the received color light. The output of a color sensor is typically connected to an analog to digital converter of a micro-controller, for example, which is employed to generate data for the system. Color sensors are utilized for ink detection, medical/life science applications, such as blood tests, camera calibration, and back light control system.

Unfortunately, many of the components of the color sensor, such as the resistors, and operational amplifier, are dependent on temperature. Ideally, the output of the color sensor maintains the identical behavior at other temperatures (e.g., 75 degrees Celsius, 100 degrees Celsius, 125 degrees Celsius). Unfortunately, although the relationship between the output and the incident light remains linear, the entire plot is typically shift up. This shift is referred to as "drift." The drift can be partially attributable to leakage current that increases as temperature rises.

Drift is a major concern for designers of color sensors because one would prefer the behavior and operation of the color sensor to remain constant over the range of operating temperatures. As can be appreciated, unpredictable circuit behavior over temperature or a changing circuit behavior over temperature is not desirable.

FIG. 1 illustrates a prior art color sensor 2. The color sensor receives light 4 and generates a voltage output 6 that represents the amount of received light 4. FIG. 2 illustrates a first output versus light graph 6 for the color sensor at a first temperature and a second output versus light graph 8 for the color sensor at a second temperature of FIG. 1. By comparing the first graph 6 with the second graph 8, drift of the output versus light graph when the temperature increases from the first temperature to a second temperature is evident. It is noted that for the same amount of light received, the color sensor 2 when operating at the second temperature (e.g., 125 degrees Celsius) generates an output that is higher than the output generated by the color sensor 2 at the first temperature (e.g., 25 degrees Celsius). As noted previously, this behavior is not desirable.

Based on the foregoing, there remains a need for a temperature compensation method and apparatus for color sensors that addresses drift and that overcomes the disadvantages set forth previously.

SUMMARY OF THE INVENTION

According to one embodiment of the present invention, a method and apparatus for compensating for variations in the output signal of a color sensor due to varying temperature of the color sensor are described. The color sensor receives light and generates an output signal that is based on the received light. The temperature compensation mechanism measures the temperature of the color sensor and uses the measured temperature to selectively adjust the output signal of the color sensor to generate a compensated output signal that is not dependent on temperature of the color sensor.

BRIEF DESCRIPTION OF THE DRAWINGS

The present invention is illustrated by way of example, and not by way of limitation, in the figures of the accompanying drawings and in which like reference numerals refer to similar elements.

FIG. 6 illustrates a first exemplary compensated output versus light graph for the color sensor of FIG. 3 at a first temperature and a second exemplary compensated output versus light graph for the color sensor of FIG. 3 at a second temperature.

DETAILED DESCRIPTION

A temperature compensation mechanism for color sensors and related method are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Temperature Compensation Mechanism (TCM) 310

Figure 3:
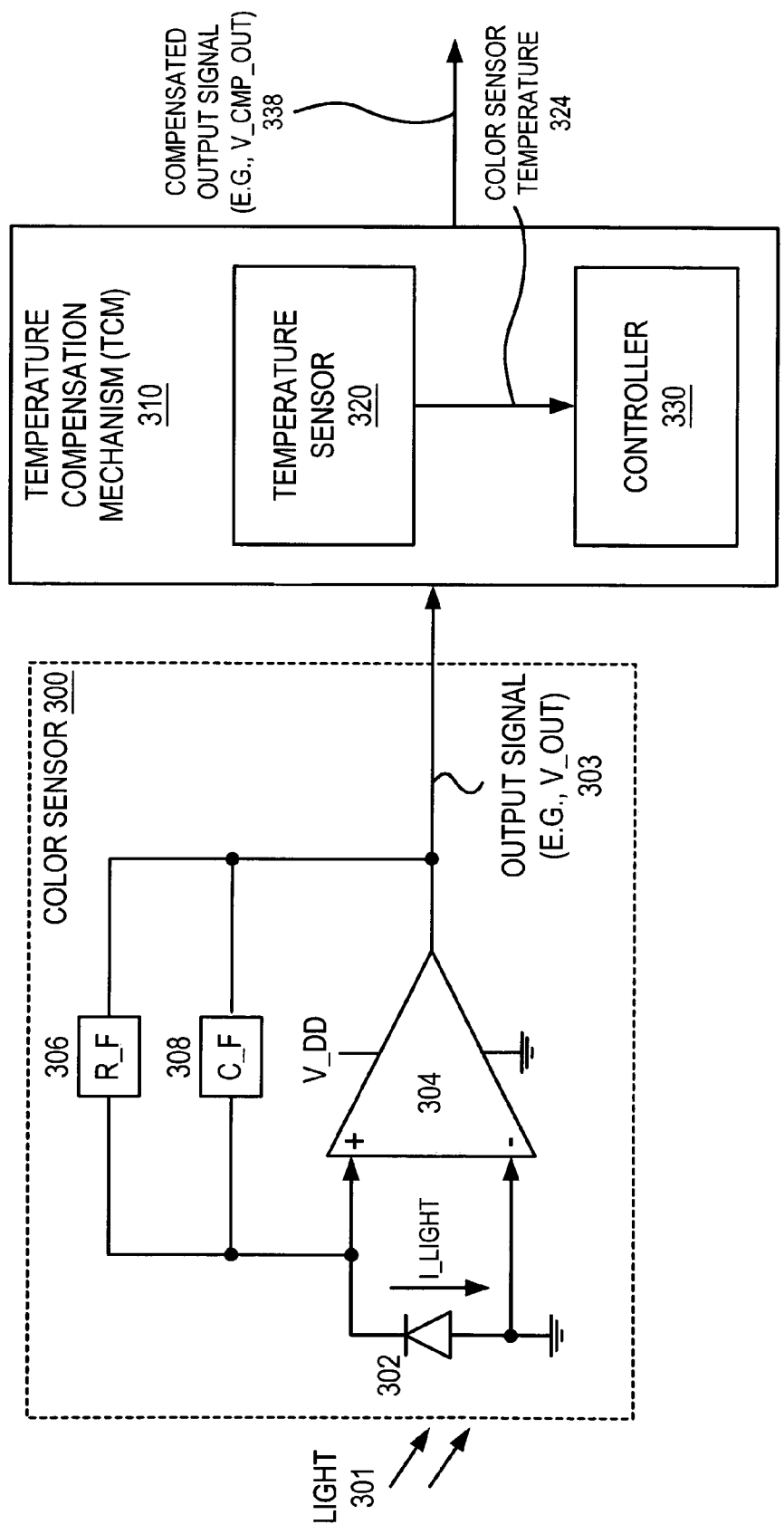
FIG. 3 illustrates a color sensor coupled to a temperature compensation mechanism according to one embodiment of the invention.

FIG. 3 illustrates a color sensor 300 coupled to a temperature compensation mechanism (TCM) 310 according to one embodiment of the invention. The color sensor 300 receives light 301 and generates an output signal (e.g., an output voltage signal (V_out)) 303 based on the received light 301. The temperature compensation mechanism 310 is coupled to the color sensor 300 to receive the output signal (e.g., V_out signal) 303. Based on the output signal 303, the temperature compensation mechanism 310 generates a compensated output signal (e.g., a compensated output voltage signal (V_cmp_out)) 338. The output response to the received light of the color sensor 300 that employs the temperature compensation mechanism (TCM 310) can be illustrated in by a compensated output signal versus light graph (e.g., waveform 610 of FIG. 6), in which compensated output signal values 338 are associated with corresponding amounts of received light 301.

Figure 1:
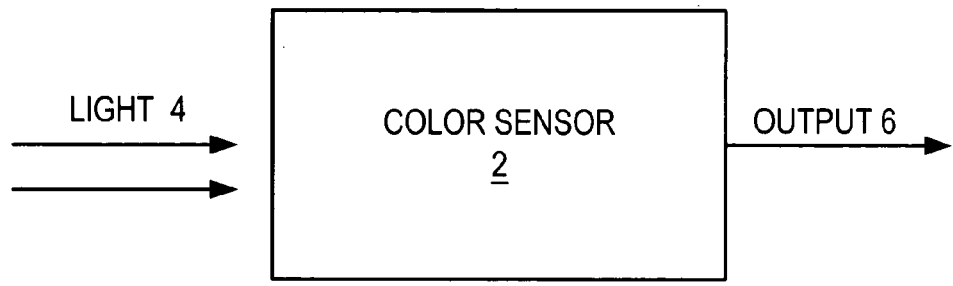
FIG. 1 illustrates a prior art color sensor.
Figure 2:
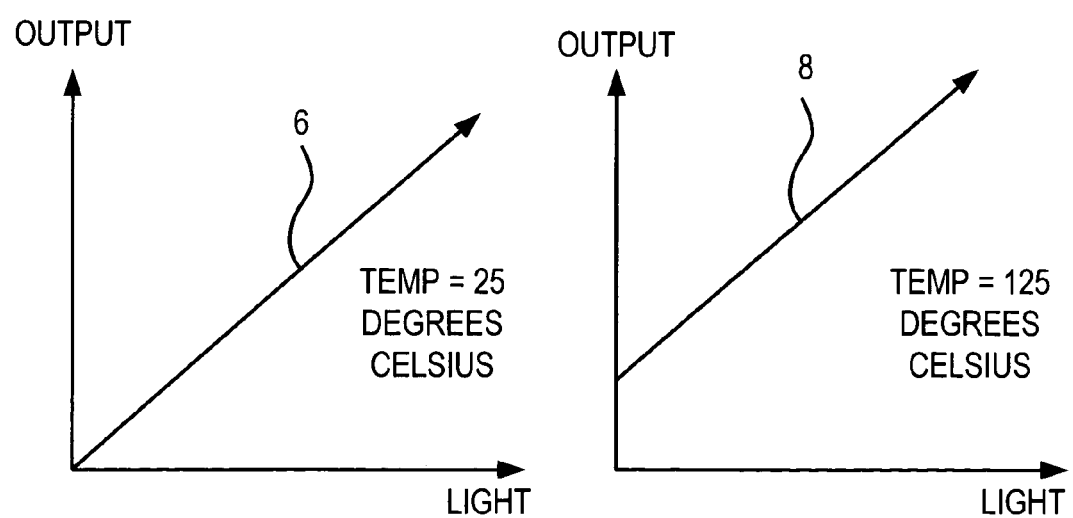
FIG. 2 illustrates a first output versus light graph for the color sensor at a first temperature and a second output versus light graph for the color sensor at a second temperature of FIG. 1.

As described previously, a color sensor (e.g., sensor 300) without the temperature compensation mechanism according to the invention generates an output signal versus light graph (e.g., output voltage signal versus light graph) that is different for different temperatures of the color sensor 300. For example, at a first temperature, the color sensor 300 generates a first output signal versus light response or graph. At a second temperature, the color sensor 300 generates a second output signal versus light response or graph. Consequently, output signal versus light response or graph of the color sensor exhibits a dependence on the temperature of the color sensor. This temperature dependence is illustrated in FIG. 2 and was previously described with reference thereto.

The temperature compensation mechanism 310 according to the invention receives the output signal (e.g., an output voltage signal (V_out)) generated by the color sensor 300 and measures or detects the temperature (324) of the color sensor 300. The temperature compensation mechanism 310 according to the invention uses the measured temperature (324) to selectively adjust the output signal of the color sensor 300 to generate a compensated output signal (e.g., a compensated output voltage signal (V_cmp_out). It is noted that the compensated output signal versus light graph for the color sensor 300 is not dependent on the temperature of the color sensor 300. In this manner, the temperature compensation mechanism 310 according to the invention enables the color sensor 300 to provide a consistent output signal versus light graph or response even as the temperature of the color sensor changes.

In one embodiment, the color sensor 300 includes a photodiode 302, a transimpedance amplifier 304, one or more external resistors (e.g., resistor 306), and one or more external capacitors (e.g., capacitor 308). These components are typically mounted on a printed circuit board (PCB). The photodiode 302 converts light 301 into a corresponding current (e.g., I_light) that represents the incident light. It is noted that the photodiode 302 can be replaced with other components that converts light into a corresponding current (e.g., a photo transistor or photo diode).

The operational amplifier 304 is coupled to a first predetermined signal (e.g., a supply voltage signal (V_DD) and a second predetermined signal (e.g., a ground potential signal). The operational amplifier 304 functions as a transimpedance amplifier and generates an output signal (e.g., an output voltage) that represents the incident light. The external components (e.g., external resistor 306 and an external capacitor 308) are feedback components used by the operational amplifier 304. It is noted that the color sensor 300 can be implemented in other ways and configured with different components and different arrangements than as shown in FIG. 3. The color sensor 300 generates a temperature dependent output signal (e.g., output voltage) versus light graph or waveform. For example, a temperature dependent output voltage versus light graph indicates that the output voltage depends on both the amount of light received and the temperature of the color sensor.

In one embodiment, the temperature compensation mechanism 310 includes a temperature sensor 320 for measuring or detecting the temperature 324 of the color sensor. It is noted that the temperature sensor 320 may be disposed in color sensor 300 or proximate to color sensor 300. The temperature sensor 320 can measure or detect the temperature at a location on the color sensor (e.g., a location on an integrated circuit of the color sensor), at a location of a component proximate the color sensor, or the temperature of an environment proximate to the color sensor. In one embodiment, the temperature sensor 320 is implemented with a thermocouple.

The temperature compensation mechanism 310 receives the output signal (e.g., output voltage (V_out)) 303 from the color sensor 300 and the measured temperature 324 of the color sensor 300. Based on these inputs, the temperature compensation mechanism 310 generates a compensated output signal (e.g., a compensated output voltage signal (V_cmp_out)) 338 that is not dependent on temperature.

In one embodiment, the temperature compensation mechanism 310 also includes a controller 330 that receives the measured temperature 324, and output 303 of the color sensor 300, and based thereon generates a re-calibrated or compensated output signal 338 for the color sensor 300 that is insensitive to the operating temperature of the color sensor 300.

The controller 330 is described in greater detail hereinafter with reference to FIG. 4. The steps performed or executed by the temperature compensation mechanism according to the invention are described in greater detail hereinafter with reference to the flow chart of FIG. 7

Controller 330

Figure 4:
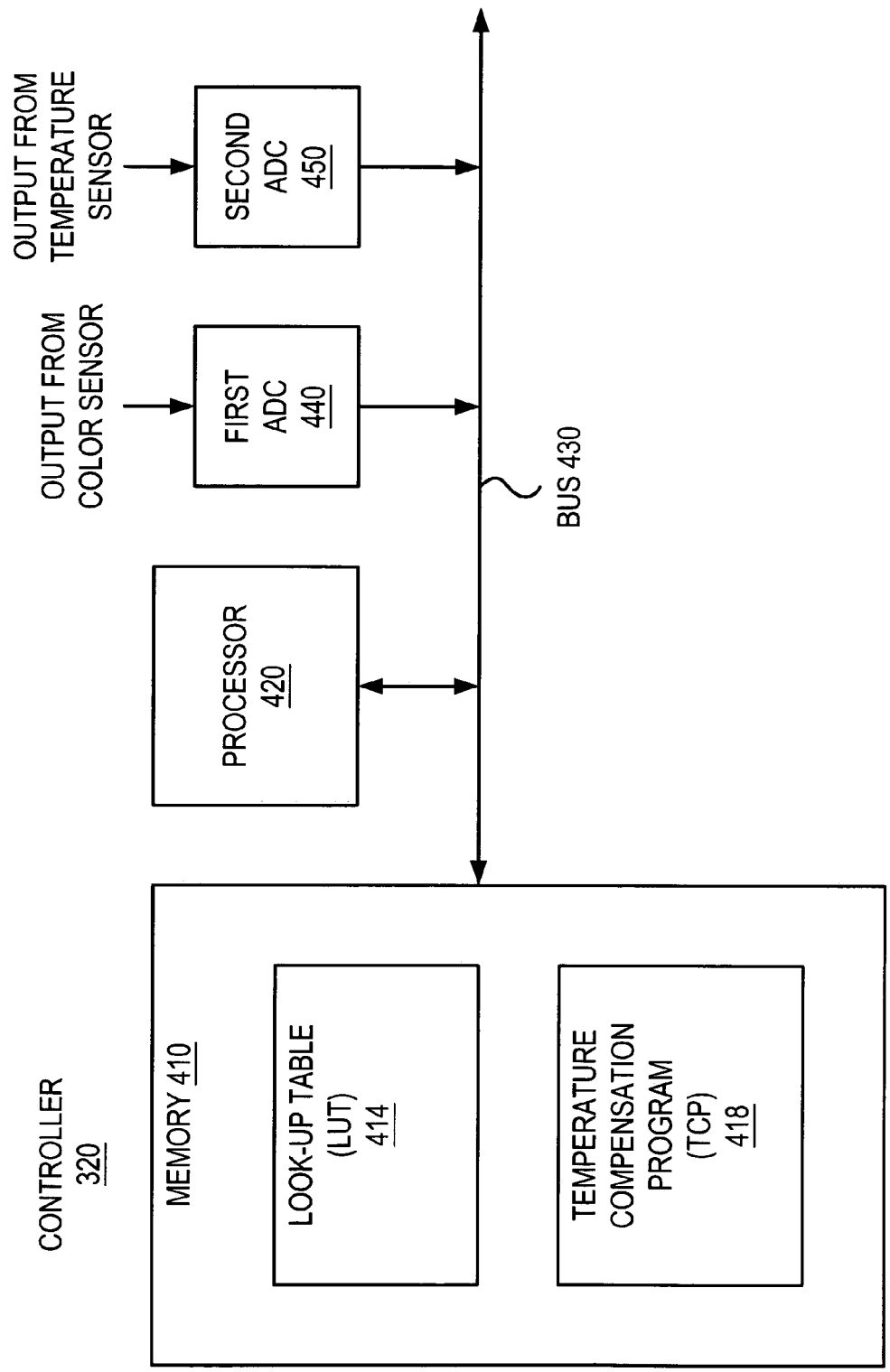
FIG. 4 illustrates in greater detail the controller of FIG. 3 according to one embodiment of the invention.

FIG. 4 illustrates in greater detail the controller 330 of FIG. 3 according to one embodiment of the invention. The controller 330 includes a memory 410 for storing data and programs and a processor 420 for executing computer programs. A bus 430 is provided for communicating information between the memory 410, processor 420, and other components (e.g., analog and digital converters 440, 450) coupled to the bus 430. The memory 410 includes a look-up table (LUT) 414 for storing compensation factors or values. In one embodiment, the compensation factors or values of the LUT 414 are addressable by temperature and output of the color sensor. The look-up table (LUT) 414 is described in greater detail hereinafter with reference to FIG. 5. The memory 410 also includes a temperature compensation program 418, which when executed by the processor 420, performs one or more of the processing steps described in greater detail hereinafter with reference to FIG. 7. The temperature compensation program 418 can be implemented as software, firmware, hardware, or a combination thereof.

The controller 330 also includes a first analog-to-digital converter (FADC) 440 for converting the output value received from the color sensor into a corresponding digital representation and a second analog-to-digital converter (SADC) 450 for converting the measured temperature value into a corresponding digital representation. It is noted that in another embodiment, the controller 330 can employ a single analog-to-digital converter (ADC) to perform both the analog to digital conversion of the measured temperature and the color sensor output.

It is noted that the controller 320 can be implemented with a general purpose processor, a micro-controller integrated circuit, or an application specific integrated circuit (ASIC). Moreover, the controller 320 can execute a general purpose operating system (e.g., Microsoft Windows TM) or a specialized operating system.

Look-Up Table 414

Figure 5:
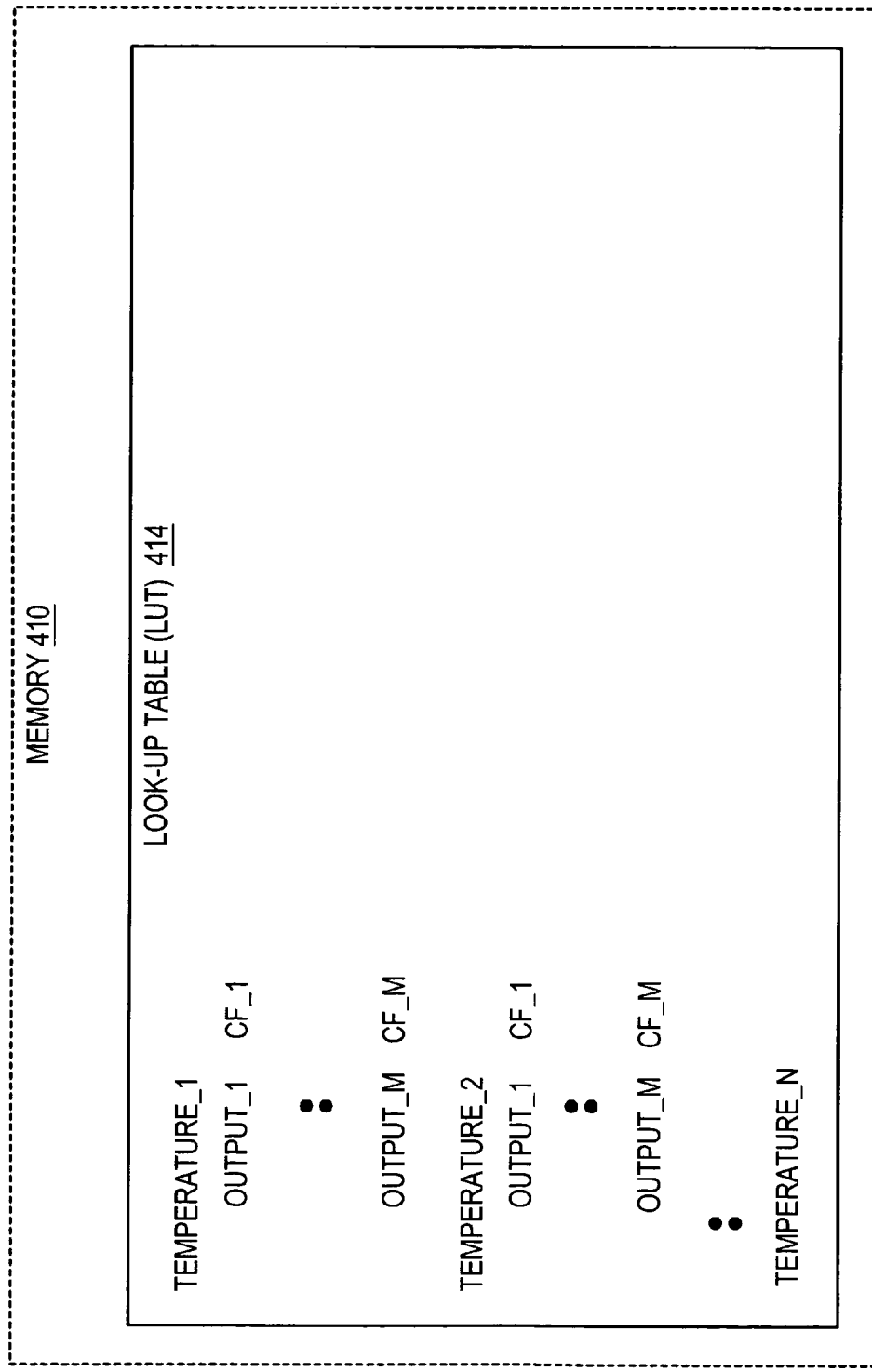
FIG. 5 illustrates in greater detail the look-up table of FIG. 4 according to one embodiment of the invention.

FIG. 5 illustrates in greater detail the look-up table 414 of FIG. 4 according to one embodiment of the invention. The look-up table 414 includes as association of sensor outputs to corresponding compensation factors or values for different temperatures. For example, in this case, there are N different temperatures (e.g., temperature_1 temperature_2, . . . temperature_N). For each temperature, there are M different associations of sensor outputs (e.g., output_1, . . . output_M) to compensation factors or values (e.g., CF_1, . . . CF_M). It is noted that there can be a different number of associations for each of the different temperatures.

In one example, the compensation factor (CF_1, . . . , CF_M) is a value that is subtracted from the output signal 303 of the color sensor to generate a re-calibrated output signal (e.g., compensated output signal) 338 that is generally not sensitive to temperature variations. In another example, the compensation factor (CF_1, . . . , CF_M) is a value that is multiplied with the output signal (303) of the color sensor to generate a re-calibrated output (e.g., a compensated output signal) 338 that is generally not sensitive to temperature variations. It is noted that other types of compensation factors or scaling factors can be stored, and other operations (e.g., a mathematical operations or logic operations) can be performed on the output signal 303 and the compensation factor to generate the compensated output signal 338. In yet another example, the compensation factor (CF_1, . . . , CF_M) is the re-calibrated output (e.g., compensated output signal 338) corresponding to the measured temperature and non-calibrated output (e.g., the output signal 303) of the color sensor.

The compensation factors or values can be derived empirically from characterization data or test results, but it can also be derived from theoretical models and simulation. In one embodiment, an algorithm is developed to utilize the compensation factors or values to cancel the leakage voltage of the color sensor due to temperature variations by one of the methods or a combination of the methods described above.

Output Versus Light Graphs

FIG. 6 illustrates a first exemplary compensated output versus light graph 610 for the color sensor of FIG. 3 at a first temperature and a second exemplary compensated output versus light graph 620 for the color sensor of FIG. 3 at a second temperature. The first graph 610 is for a measured temperature of 25 degrees Celsius, and the second graph 620 is for a measured temperature of 125 degrees Celsius. The prior art color sensors without the temperature compensation mechanism according to the invention exhibit output versus light graphs that indicate drift as the temperature rises (see FIG. 2).

In contrast, a color sensor that utilizes the temperature compensation mechanism according to the invention has a compensated output versus light graphs (e.g., 610 and 620) that do not exhibit drift. The temperature compensation mechanism according to the invention uses the measured temperature of the color sensor to selectively adjust the output signal of the color sensor to generate a compensated output signal (e.g., a compensated output voltage signal 338). The temperature compensation mechanism according to one embodiment of the invention prevents the output signal versus light graph from drifting as temperature varies, thereby providing a consistent output signal versus light response even as temperature of the color sensor changes. In this regard, the compensated output 338 versus light behavior of the color sensor 300 that employs the temperature compensation mechanism 310 according to the invention remains relatively constant, consistent, and un-changing over temperature.

Processing

Figure 7:
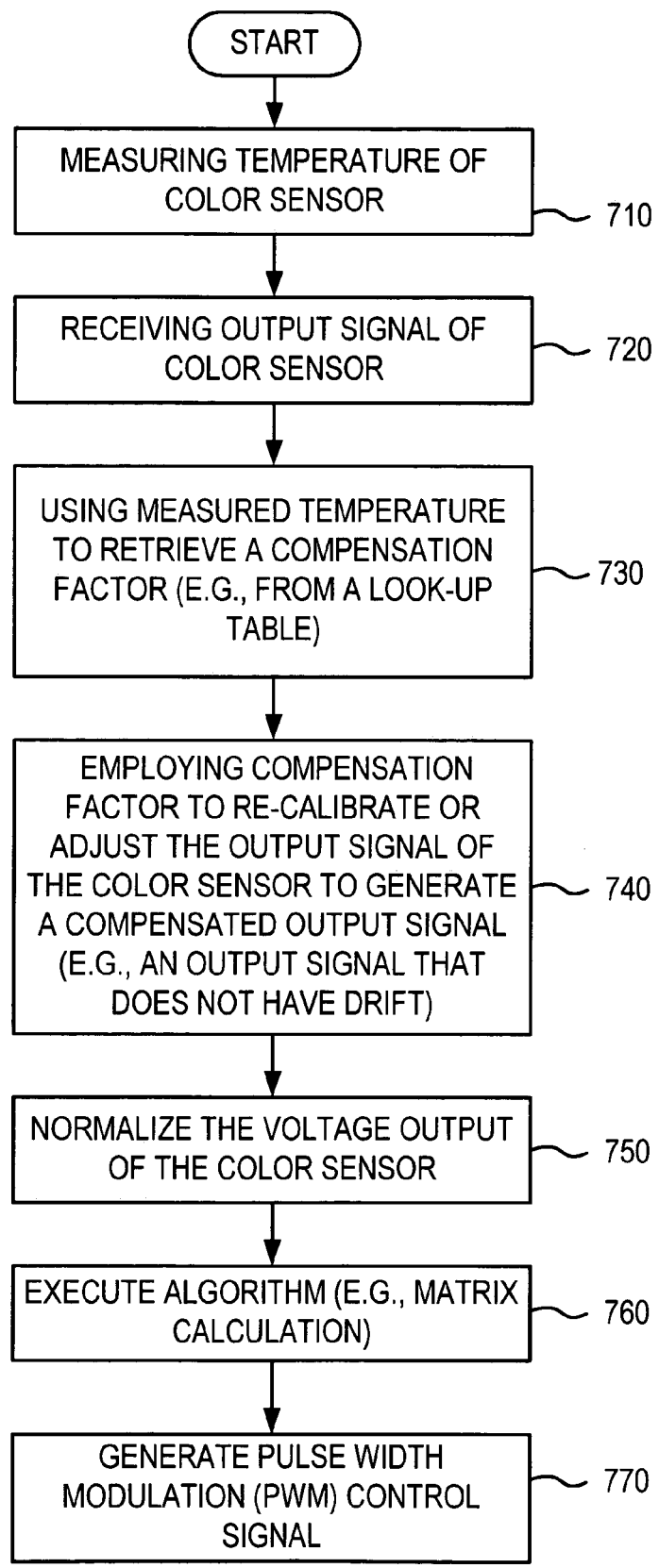
FIG. 7 is a flow chart illustrating the processing steps of a method for compensating for variations in output voltage of a color sensor due to temperature changes in a color sensor according to one embodiment of the invention.

FIG. 7 is a flow chart illustrating the processing steps of a method for compensating for variations in output voltage of a color sensor due to temperature changes in a color sensor according to one embodiment of the invention. In step 710, a temperature of the color sensor is measured by utilizing, for example, a temperature sensor. Step 710 can includes the step of converting the measured temperature into a digital representation thereof.

In step 720, the output signal (e.g., output voltage) of the color sensor is received. Step 720 can include the step of converting the output signal into a digital representation thereof.

In step 730, the measured temperature is utilized to retrieve a compensation factor. For example, step 730 can include the step of accessing a look-up table accessed by using a digital representation of the temperature. For example, a compensation factor or value may be accessed from the look-up table based on the temperature. This compensation factor or value is then utilized in the re-calibration process of step 740.

In step 740, the compensation factor is employed to re-calibrate or adjust the output signal of the color sensor to generate a compensated output signal 338. The compensated output signal 338 is an output signal that is not sensitive to different operating temperatures. For example, the compensated output signal does not exhibit drift as the output voltage of prior art color sensors. As illustrated in FIG. 6, the color sensor with the temperature compensation mechanism (TCM) according to the invention generates a compensated output signal 338 that is generally insensitive to the temperature of the color sensor.

For example, the compensation factor or value may be utilized to adjust the digital representation of the output signal of the color sensor. For example, the output signal of the color sensor may be adjusted to offset or cancel out the leakage voltage due to temperature variations. In this manner, the compensated output signal versus light graph of the color sensor is the same for different operating temperatures, thereby eliminating drift as illustrated in FIG. 6.

It is noted that the output signal 303 of the color sensor (302) varies when temperature changes. In this embodiment, a controller uses the temperature signal 324 generated by a temperature sensor (320) to determine what number in the look-up table (414) to use so that the sensor's (320) output excludes the "temperature effect" (e.g., make the output of the sensor independent of temperature). For instance, at 25 C. the output of the color sensor output is 1.5V, volt, but at 50 C., the color sensor output is 1.8V. In this embodiment, a controller detects the temperature and employs the look-up table to automatically correct or adjust the output signal of 1.8V to 1.5V to compensate for the temperature effect.

In step 750, the voltage signal (e.g., output voltage) of the color sensor is normalized. For example, in one embodiment, step 750 is a scaling operation. As an example, consider the following sensor outputs after step 740: Va=2.3 V, Vb=2.1V, and Vc=1.8V. The normalization step involves finding the largest output, in this case Va, and dividing each output by Va, thereby resulting in a normalized output of: sensor outputs after division of Va(norm)=1.0, Vb(norm)= 0.91, and Vc(norm)=0.78.

Va(norm):Vb(norm):Vc(norm) can be further multiplied by another scaling factor if needed. It is noted that the ratio between the three sensor outputs does not change with normalization. Normalization ensures that the outputs of the sensor provided to the device in step 760 be in a pre-defined range (e.g., outputs that are bounded).

It is noted that in a non-feedback system the temperature-calibrated sensor is used as a measurement device. In this case, where a subsequent device using the temperature-calibrated sensor does not require a normalized output, the processing flow stops after step 740. Otherwise, the flow stops after step 750.

Steps 760 and 770 are an example of how a color sensor can be used in a lighting system application with optical feedback. In step 760, an algorithm (e.g., a matrix calculation) is executed. In step 760 (e.g., in a lighting system application with optical feedback) the sensor output is compared with a predetermined target value that may be specified by a user. This target value corresponds to a particular output color being emitted by the lighting system with optical feedback. If the sensor output is different from the target value, an error value is generated.

In one embodiment, a "matrix calculation" is performed in step 760. In this system (i) the color sensor has three outputs, and (ii) there are three PWM output signals. The value of the three outputs (e.g., a matrix of three elements) defines the color of the light incident on the color sensor. The target color is also specified as a matrix of three elements by the user. In this case, an error matrix that has three elements is generated by a difference operation between target color and measured color. In step 770, a matrix calculation may be employed to compute the PWM signals needed to reduce the errors to zero. For example, an iterative feedback system can be employed where the PWM output signals are adjusted based on some estimate. The estimated adjustment allows the values in the error matrix to get progressively smaller until they reach zero. The estimated adjustment can be obtained by multiplying the error matrix with a sensitivity matrix. The elements of the sensitivity matrix are basically weights that allow the error matrix to converge to zero after a number of feedback loops.

In step 770, one or more pulse width modulation (PWM) control signals are generated. Step 770 operates on that error value to adjust the PWM output signals. The objective of the PWM adjustment is to obtain an error value of zero. The PWM signals control the light intensity of some light emitting means (e.g., light emitting diodes (LEDs)) in the lighting system with optical feedback. If a combination of red, green or blue LEDs is used with each color controlled by an independent PWM signal, the color of combined light output is controlled and maintained using the above described feedback system.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An apparatus coupled to a color sensor that receives light and based thereon generates an output signal; wherein the color sensor includes a temperature, said apparatus comprising:
    a) a temperature compensation mechanism that receives the output signal from the color sensor, measures the temperature of the color sensor, and uses the measured temperature to selectively adjust the output signal of the color sensor to generate a compensated output signal that is not dependent on the temperature of the color sensor.

2. The apparatus of claim 1 wherein the temperature compensation mechanism includes
    a temperature sensor for measuring the temperature of the color sensor.

3. The apparatus of claim 2 wherein the temperature compensation mechanism includes
    a controller coupled to the temperature sensor for receiving the temperature of the color sensor; wherein the controller employs the temperature of the color sensor to selectively modify the output signal of the color sensor to generate a compensated output signal.

4. The apparatus of claim 3 wherein the controller employs a first compensation algorithm for selectively modifying the output signal of the color sensor to cancel or offset the leakage current due to temperature variations.

5. The apparatus of claim 1 wherein the temperature compensation mechanism compensates for variations in the output signal of a color sensor due to temperature changes and prevents drift of the output signal versus light graph as temperature of the color sensor varies.

6. The apparatus of claim 2 wherein the temperature sensor measures the temperature at one of a location on the color sensor, a location of a component proximate the color sensor, and an environment proximate to the color sensor.

7. The apparatus of claim 2 wherein the temperature sensor includes a thermocouple.

8. The apparatus of claim 1 wherein the temperature compensation mechanism includes a temperature compensation program that when executed by a processor receives the output signal generated by the color sensor, receives the measured temperature of the color sensor, and based thereon generates a compensated output signal that is not dependent on the temperature of the color sensor.

9. The apparatus of claim 1 wherein the temperature compensation mechanism includes a look-up table that associates output signals and compensated output signals for different temperatures.

10. The apparatus of claim 1 wherein the temperature compensation mechanism includes a look-up table that associates output signals and compensation factors for different temperatures.

11. A method for compensating for variations in output signal of a color sensor due to temperature changes in a color sensor comprising:
    measuring a temperature of the color sensor; and
    employing the measured temperature to selectively adjust the output signal of the color sensor to generate a compensated output signal that is not dependent on temperature variations of the color sensor.

12. The method of claim 11 wherein employing the measured temperature to selectively adjust the output signal of the color sensor to generate a compensated output signal that is not dependent on temperature variations of the color sensor includes
    compensating for leakage current of the color sensor due to temperature variations.

13. The method of claim 11 wherein the step of measuring a temperature of the color sensor includes the step of
    converting the measured temperature into a digital representation thereof.

14. The method of claim 11 wherein employing the measured temperature to selectively adjust the output signal of the color sensor to generate a compensated output signal that is not dependent on temperature variations of the color sensor includes
    using the measured temperature to retrieve a compensation factor; and
    employing the compensation factor to adjust the output signal of the color sensor to generate a compensated output signal that is not dependent on different operating temperatures of the color sensor.

15. The method of claim 14 wherein the step of using the measured temperature to retrieve a compensation factor includes
    converting the measured temperature into a digital representation thereof; and
    accessing a look-up table accessed by using a digital representation of the temperature.

16. The method of claim 14 wherein employing the compensation factor to adjust the output signal of the color sensor to generate a compensated output signal that is not dependent on different operating temperatures of the color sensor includes
    adding the compensation factor to the output signal of the color sensor, subtracting the compensation factor from the output signal of the color sensor,
multiplying the output of the color sensor with the compensation factor, and
applying a compensation algorithm to the output signal of the color sensor that uses the compensation factor.

17. The method of claim 11 further comprising the step of normalizing the voltage output of the color sensor;

executing an algorithm; and
generating one or more pulse width modulation (PWM) control signals.

18. The method of claim 17 wherein the step of executing an algorithm includes performing a matrix calculation.

* * * * *